United States Patent [19]
Yamazaki

[11] 4,447,179
[45] May 8, 1984

[54] TRACER HEAD ADJUSTMENT METHOD

[75] Inventor: Etuo Yamazaki, Hachioji, Japan

[73] Assignee: Fujitsu Fanuc Limited, Tokyo, Japan

[21] Appl. No.: 384,289

[22] Filed: Jun. 2, 1982

Related U.S. Application Data

[63] Continuation of Ser. No. 23,461, Mar. 23, 1979, abandoned.

[30] Foreign Application Priority Data

Mar. 23, 1978 [JP] Japan .................................. 53-33399

[51] Int. Cl.$^3$ ...................... B23Q 33/00; B23Q 35/30
[52] U.S. Cl. ........................................ 409/127; 336/45
[58] Field of Search ................. 409/126, 127, 128, 80; 318/472; 336/45

[56] References Cited

U.S. PATENT DOCUMENTS 2,858,071 10/1958 Stokes .............................. 409/126 X
2,939,287 6/1960 Capron et al. ................... 409/127 X

*Primary Examiner*—Z. R. Bilinsky
*Attorney, Agent, or Firm*—Staas & Halsey

[57] ABSTRACT

A method of adjusting for a shift of the position of a stylus tip and a deviation of the zero point of a displacement detector which are caused by an exchange of a stylus of a tracer head. The shift of the position of the stylus tip and the deviation of the zero point of the displacement detector are electrically or mechanically read out as displacement. In accordance with the displacement, the tracer head assembly is moved relative to a machine frame to adjust the tip of the stylus to its reference position.

1 Claim, 9 Drawing Figures

FIG. 1A PRIOR ART
FIG. 1B PRIOR ART
FIG. 1C PRIOR ART
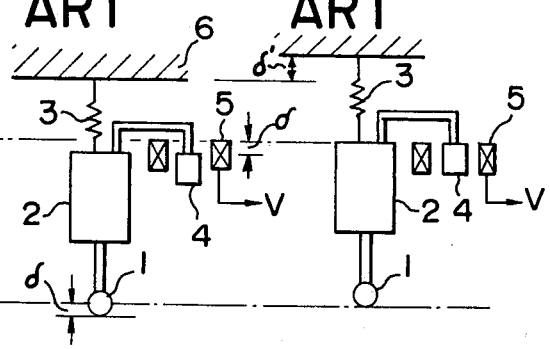
FIG. 3A  FIG. 3B  FIG. 3C  FIG. 3D
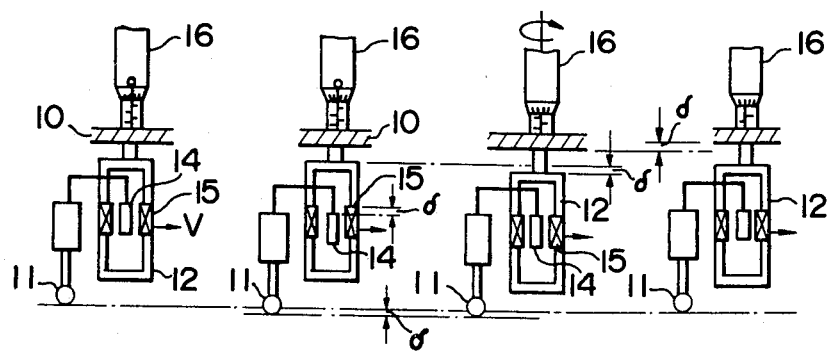

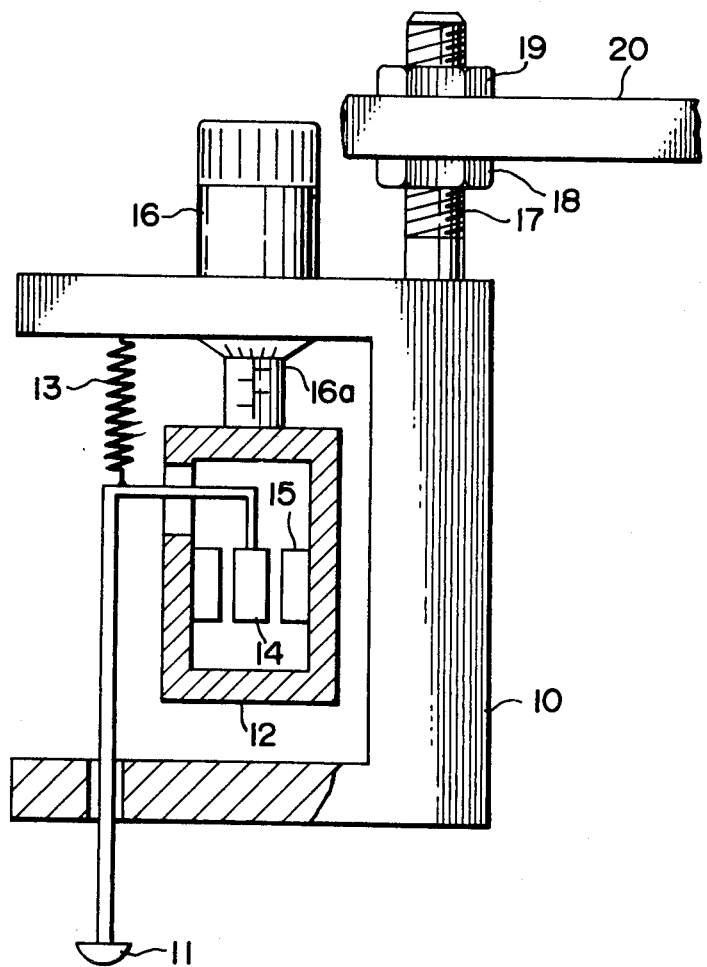

TRACER HEAD ADJUSTMENT METHOD

This is a continuation of Ser. No. 23,461 filed Mar. 23, 1979, now abandoned.

BACKGROUND OF THE INVENTION

1. Field of the Invention

This invention relates to a method of adjusting a tracer head for use in a profiling machine, and more particularly to a tracer head adjustment method which adjusts the tip position of a stylus of a tracer head to a reference position and makes a zero adjustment of a displacement detector.

2. Description of the Prior Art

A profiling machine performs work while detecting the shape of a model with a tracer head. Since it is desirable that a stylus of the tracer head for contact with the model has a tip configuration conforming to the shape of the machine tool used, an exchange of the machine tool is usually accompanied by an exchange of the stylus with a new one. Such a stylus exchange causes a deviation of the zero point of the displacement detector of the tracer head and a shift of the stylus tip from its reference position due to a difference in weight between the two styli; therefore, readjustment is needed.

The adjustment of the tracer head in the prior art is achieved by adjusting a mechanism in the tracer head. For example, as shown in FIGS. 1A to 1C, a stylus 1 is linked via a displacement transmission mechanism 2 to a core 4 of a differential transformer and the displacement transmission mechanism 2 is suspended by a spring 3 from a support part 6 in the tracer head to establish equilibrium with gravity; in this equilibrium state, the output V from a coil 5 of the differential transformer is zero. In the equilibrium state such as shown in FIG. 1A, if the weight of the stylus 1 increases by $\Delta W$ to $W+\Delta W$ as a result of its exchange with a new one, the stylus 1 diplaced by $\delta$ corresponding to $\Delta W$, as shown in FIG. 1B, so that the output V from the coil 5 of the differential transformer becomes $V(\delta)$ corresponding to the displacement $\delta$.

In such a state as shown in FIG. 1B, the tip of the stylus 1 shifts from its reference position by $\delta$ and the displacement detection voltage changes to $V(\delta)$; and if profile control is conducted without regard to the shifted tip position of the stylus, a large error resulted. Therefore, zero adjustment is needed in which the support 6 is moved by $\delta'$ so that the tip of the stylus 1 assumes its reference position to reduce the displacement detection voltage to zero, and thereby obtain the equilibrium state.

However, recent miniaturization of the tracer head imposes limitations on the space for the spring 3 for suspending the displacement transmission mechanism 2 and, in addition, entails difficulty on the adjustment of the supporting position of the spring 3. Especially, in a horizontal tracer head, it is difficult to adjustably provide the spring for suspending the displacement transmission mechanism 2 to achieve equilibrium with gravity.

SUMMARY OF THE INVENTION

An object of this invention is to provide a method which allows ease in the adjustment of a tracer head accompanying an exchange of a stylus.

Briefly stated, in the present invention, a shift in the position of the tip of the stylus from its reference position and a deviation of the zero point of the displacement detector, which are caused by an exchange of the stylus of the tracer head, are electrically or mechanically detected in the form of displacement and, in accordance with the displacement, the tracer head assembly is moved relative to the frame of the profile machine, thereby to adjust the tip position of the stylus to its reference position.

BRIEF DESCRIPTION OF THE DRAWINGS

FIGS. 1A to 1C are diagrams explanatory of a conventional tracer head adjustment method;

FIG. 2 is a diagram schematically illustrating a tracer head embodying this invention; FIGS. 3A to 3D are diagrams explanatory of the tracer head adjustment method of this invention.

DESCRIPTION OF THE PREFERRED EMBODIMENTS

Figure 4:
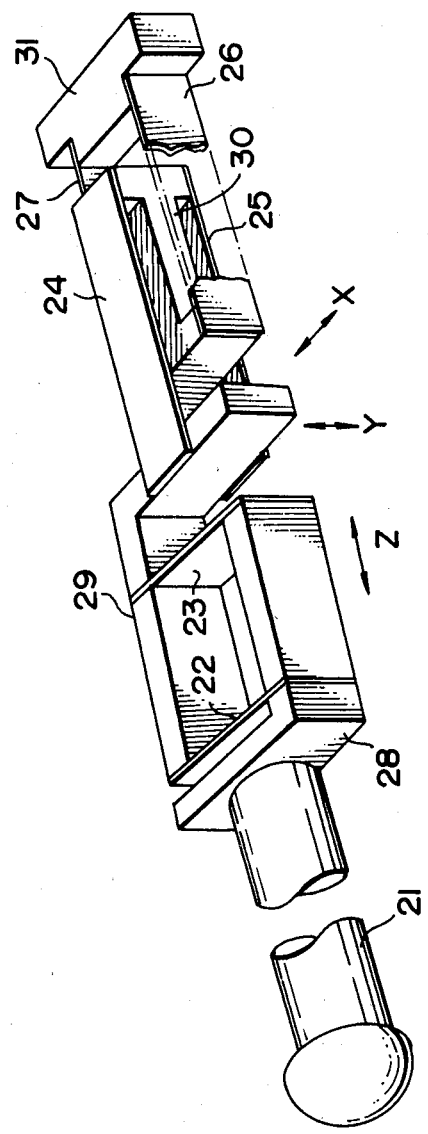
FIG. 4 is a perspective view schematically showing an example of a displacement transmission mechanism for use in this invention.

FIG. 2 is explanatory of the construction of a tracer head embodying this invention. Reference numeral 10 indicates a frame of the tracer head; 11 designates a stylus; 12 identifies a differential transformer support; 13 denotes a spring; 14 represents a core of a differential transformer; 15 shows a coil of the differential transformer; 16 refers to a position adjustment mechanism; 16a indicates a scale; 17 designates an adjust screw; 18 and 19 identify nuts; and 20 denotes a machine frame.

FIGS. 3A to 3D are explanatory of the adjustment method of this invention. FIG. 3A shows a state in which zero adjustment in the case of the weight of the stylus 11 being W is completed. When the weight of the stylus 11 becomes $W+\Delta W$ as a result of a stylus exchange, the tip of the stylus 11 is displaced by $\delta$ with the increase of $\Delta W$, as shown in FIG. 3B, and the output from the coil 15 of the differential transformer becomes $V(\delta)$, as described previously with regard to FIG. 1B. Then, by using the position adjustment mechanism 16 similar in construction to a micrometer adjustment unit, the differential transformer support 12 is displaced by $\delta$, as shown in FIG. 3C, thereby to reduce the output V from the coil 15 of the differential transformer to zero. This adjustment takes place to reduce the output V from the coil 15 to zero while displaying the coil output on a display, so that the adjustment is easy to perform. The distance of movement by the adjustment corresponds to the displacement $\delta$, which is read from the scale 16a. Since the value of the displacement $\delta$ is available from the scale 16a, the tracer head is raised by the adjust screw 17 and the nuts 18 and 19 by $\delta$, as shown in FIG. 3D. As a consequence, the tip of the stylus 11 is brought up to its reference position and the output V from the coil 15 of the differential transformer is reduced to zero. In this way, the zero adjustment is achieved.

As described previously, the adjustment accompanying a stylus exchange is conducted by adjusting the zero point of the displacement detector (the differential transformer) in the tracer head and by adjusting the positional deviation of the stylus by moving the tracer head assembly.

The scale 16a need not always be provided on the position adjustment mechanism 16. In such a case, the output V=V(δ) from the coil 15 of the differential transformer in the state of FIG. 3B is indicated as a displacement on the display and, in accordance with the indicated displacement, the differential transformer is adjusted, as depicted in FIG. 3C, and then, the tracer head assembly is moved in accordance with the indicated displacement, as shown in FIG. 3D.

The adjustment of the differential transformer, depicted in FIG. 3C, may also be omitted. In this instance, the displayed displacement is read out in the state of FIG. 3B, as is the case with the above, and in accordance with the displayed displacement, the tracer head assembly is shifted to bring the tip of the stylus 11 to its reference position and the resulting displacement output is stored for addition or subtraction to compensate for displacement in profile control.

FIG. 4 is a perspective view illustrating an example of the displacement transmission mechanism of the tracer head. Reference numeral 21 indicates a stylus; 22 to 27 designate plate springs; and 28 to 31 identify support members. Pairs of parallel plate springs permit displacement of the stylus 21 in the X-, Y- and Z-axis directions.

In the case of a vertical tracer head, the support member 31 is attached to the frame of the tracer head so that the stylus 21 is suspended vertically. When the stylus 21 is displaced in the Z-axis direction, the support member 28 is moved by the pair of plate springs 22 and 23 in parallel to the support member 29. In this instance, since the plate springs 22 and 23 correspond to the spring 13 in FIG. 2, the structure of FIG. 4 can be applied to the tracer head assembly of FIG. 2 by mounting the core of the differential transformer on the support member 28 and a coil on the differential transformer support (not shown), attaching this support to the tracer head frame through the position adjustment mechanism and mounting the tracer head to the machine frame in a manner to be adjustable.

When the stylus 21 is displaced in the X-axis direction, the support member 30 is moved by the pair of plate springs 26 and 27 in parallel to the support 31. Where the stylus 21 is displaced in the Y-axis direction, the support member 29 is moved by the pair of plate springs 24 and 25 in parallel to the support member 30. Accordingly, a displacement detector, such as a differential transformer or the like, is disposed so that it can detect displacements between the support members 30 and 31 and between the support members 29 and 30.

In a horizontal tracer head, due to the tare of the stylus 21, for example, the pair of plate springs 24 and 25 are deformed to urge the support member 29 in parallel to the support member 30. Accordingly, in the case where the core of the differential transformer is mounted on the support member 29, the coil of the differential transformer is mounted on its support which is supported by a Y-axis position adjustment mechanism and the tracer head frame is mounted on the machine frame in the Y-axis direction. The zero adjustment can be achieved by the same means as described previously.

In accordance with the invention described above, upon occurrence of displacement of the zero point of a displacement detector and in the tip position of a stylus as a result of a stylus exchange, the displacement detection output corresponding to the displacement of the zero point or a displacement in the zero adjustment is read out and, in accordance with the displacement, the tracer head assembly is moved relative to the machine frame, thereby to bring the stylus tip to its reference position, as described in the foregoing. Accordingly, this invention does not involve adjustment of the balancing spring. Especially in a horizontal tracer head, even if the construction is simplified, it is possible to adjust the displacement in the tip position of the stylus and in the zero point of the displacement detector; therefore, this invention is of great utility in practical use.

It will be apparent that many modifications and variations may be effected without departing from the scope of novel concepts of this invention.

What is claimed is:

1. A method of adjusting a horizontally mounted tracer head assembly that is subject to deformation, wherein the tracer head assembly is movably mounted on a machine frame and includes a tracer frame, a stylus having a tip that has a reference position with respect to said machine frame and said stylus being interchangeable with different styluses, support members and respective parallel plate members connected to corresponding ones of the support members for permitting displacement of the stylus in X-, Y- and Z-axis directions from said reference position and wherein said Y-axis direction is selected to be in the vertical direction, and displacement detectors for detecting displacements corresponding to the relative positions of the respective ones of said support members along the respective axis directions from corresponding reference displacements, said method comprising the steps of:
  (a) changing the stylus of the tracer head assembly to one having a different weight so that the displacements detected by said displacement detector corresponding to said Y-axis direction is different from the respective one of said reference displacements,
  (b) detecting a voltage across the Y-axis displacement detector for detecting the displacement, corresponding to the relative position of the respective support member with respect to the corresponding reference displacement along said Y-axis direction;
  (c) displaying data corresponding to the deviation of the detected voltage from a corresponding reference voltage corresponding to the respective reference displacement along said Y-axis direction;
  (d) adjusting the Y-axis displacement detector until the voltage of the Y-axis displacement detector is approximately equal to said reference voltage; and
  (e) moving the tracer head assembly in the Y-axis direction relative to the machine frame to bring the tip of the stylus being employed to said reference position,
wherein deformation of said horizontally mounted tracer head in said vertical direction is compensated for so as to simultaneously provide said reference voltage from said position detector and said top of the stylus at said reference position with respect to said machine frame.

* * * * *

UNITED STATES PATENT AND TRADEMARK OFFICE
CERTIFICATE OF CORRECTION

PATENT NO. : 4,447,179
DATED : 8 May 1984
INVENTOR(S) : Etuo Yamazaki

It is certified that error appears in the above-identified patent and that said Letters Patent is hereby corrected as shown below:

```
Col. 1,    line 41,   before "displaced" insert --is--;
           line 49,   "resulted" should be --results--.

Coo. 3,    line 33,   "the" should be --a--;
           line 34,   "tracer head" should be --machine--;
           line 48,   "tare" should be --weight--;
           line 50,   "to urge" should be --while urging--;
           line 50,   after "29" insert --to remain--;
           line 61,   "in" should be --of--.
```

Signed and Sealed this

Eleventh Day of December 1984

[SEAL]

Attest:

GERALD J. MOSSINGHOFF

*Attesting Officer*    *Commissioner of Patents and Trademarks*